E. ALTENKIRCH & B. TENCKHOFF.
ABSORPTION MACHINE.
APPLICATION FILED AUG. 9, 1912.

1,180,687.

Patented Apr. 25, 1916.
6 SHEETS—SHEET 1.

WITNESSES
J. M. Wynkoop.
Geo. H. Copenhaver.

INVENTORS
Edmund Altenkirch
and Bernhard Tenckhoff
By Knight Bros
Attorneys.

E. ALTENKIRCH & B. TENCKHOFF.
ABSORPTION MACHINE.
APPLICATION FILED AUG. 9, 1912.

1,180,687.

Patented Apr. 25, 1916.
6 SHEETS—SHEET 2.

WITNESSES
J. M. Wynkoop
Geo. H. Copenhaver

INVENTORS
Edmund Altenkirch
and Bernhard Tenckhoff,
By Knight Bros
Attorneys.

E. ALTENKIRCH & B. TENCKHOFF.
ABSORPTION MACHINE.
APPLICATION FILED AUG. 9, 1912.

1,180,687.

Patented Apr. 25, 1916.
6 SHEETS—SHEET 4.

UNITED STATES PATENT OFFICE.

EDMUND ALTENKIRCH, OF FREDERSDORF, NEAR BERLIN, AND BERNHARD TENCKHOFF, OF FRIEDENAU, NEAR BERLIN, GERMANY.

ABSORPTION-MACHINE.

1,180,687.  Specification of Letters Patent.  Patented Apr. 25, 1916.

Application filed August 9, 1912. Serial No. 714,285.

*To all whom it may concern:*

Be it known that we, EDMUND ALTENKIRCH and BERNHARD TENCKHOFF, both subjects of the German Emperor, residing at Fredersdorf, near Berlin, and Friedenau, near Berlin, Germany, have invented certain new and useful Improvements in Absorption-Machines, of which the following is a specification.

In hitherto proposed absorption machines, the refrigerating effect must be notably smaller than the quantity of heat added to the generator or boiler. The present invention causes an increase of the refrigerating effect. In special cases the refrigerating effect will be twice or three times greater than the refrigerating effect of the machines hitherto known, so that the refrigerating effect will be greater than the quantity of heat required for its production.

Several embodiments of the invention are illustrated in the accompanying drawings, in which—

Throughout the specification, the same characters denote the same parts.

The heat expenditure in these machines is diminished by pumping the old liquor, after having absorbed gas, back through the absorber in counter current, so that the rich liquor assists in cooling the absorber before leaving it, which it does at the approximately initial temperature of the absorber, *i. e.* the temperature at which the weak liquid entered. This causes the rich liquid in the exchanger to be heated to a higher temperature, than it is possible to do without this counter current of the liquor. It will also be advantageous to send the hot weak liquor back before its leaving the generator in counter current through the latter. As a consequence, the rich liquor will enter the rectifier with a lower temperature, which causes better drying of gas and at the same time a smaller expenditure of heat to add to the generator.

Figure 1:
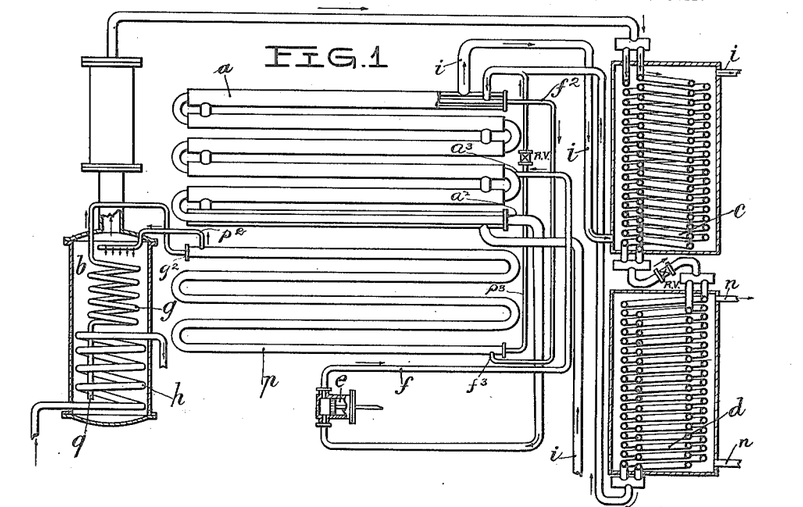
Figure 1 represents an absorption machine according to the present invention.

Fig. 1 shows an absorption machine arranged according to the present invention. The cold rich liquor is forced from the absorber $a$ at $a^2$ by the pump $e$ into the piping $f$ and goes back through the absorber in counter current entering at $a^3$, taking heat therefrom before leaving. By way of pipe $f^2$ the liquor then enters the exchanger $p$ at $f^3$ and cools the hot weak liquor entering at $g^2$ and coming from the generator $b$ after which it is led through pipe $p^2$ and enters the top of the generator $b$. Here it descends, gradually becoming denser as distillation proceeds, and enters the pipe $g$ at $q$ retraverses the generator $b$ and passing in at $g^2$ is then forced through exchanger $p$ and pipe $p^3$ to absorber $a$. It will thus be seen that the coiled pipe $g$ actually forms a part of the absorber. $c$ is the condenser, $d$ the evaporator or refrigerator, $h$ the steam coil, $i$ the cooling water system and $n$ the brine system.

Figure 2:
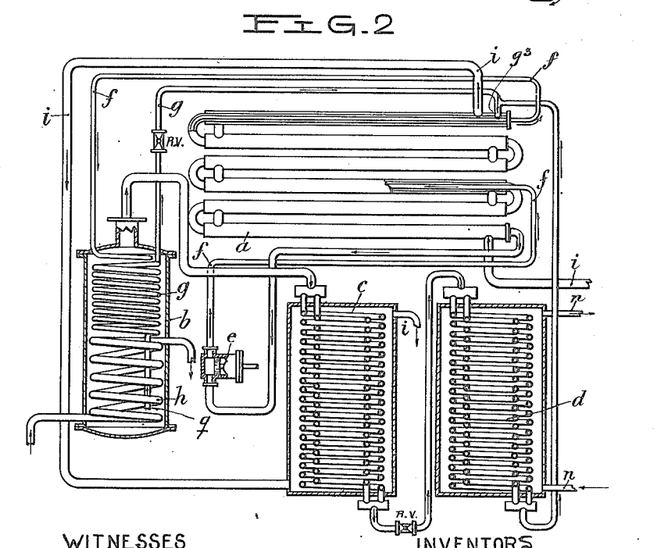
Fig. 2, an absorption machine, generator and absorber with a heat exchanger.

In the arrangement just described, distillation is supposed to be only small so that a separate exchanger is still advantageous. The advantages consequent on leading the liquors in counter current will be still greater if distillation is carried farther. Machines suitable for this purpose are well known and may be easily adapted for the counter current system of liquors. Thus let it be supposed that distillation is carried to such an extent that the weak liquor coming from the generator absorbs gas at a temperature which causes distillation of the rich liquor in the generator, in other words that the initial temperature of the generator at its top is the same as the initial temperature of the absorber. Their the temperature of the rich liquor leaving the absorber, equals approximately the initial temperature of the absorber and it also equals the initial temperature of the generator; the weak liquor leaving the generator at the same time being at the initial temperature of the generator, also has the initial temperature of the absorber, so that a separate exchanger will be superfluous. Fig. 2 represents such an absorption machine generator and absorber working in the manner described, the pipes $g$ and $f$ having no transferring connection, other reference characters corresponding to those used in Fig. 1. The pipe $g$ in this construction leading directly to the absorber $a$ which it enters at $g^3$.

Figure 3:
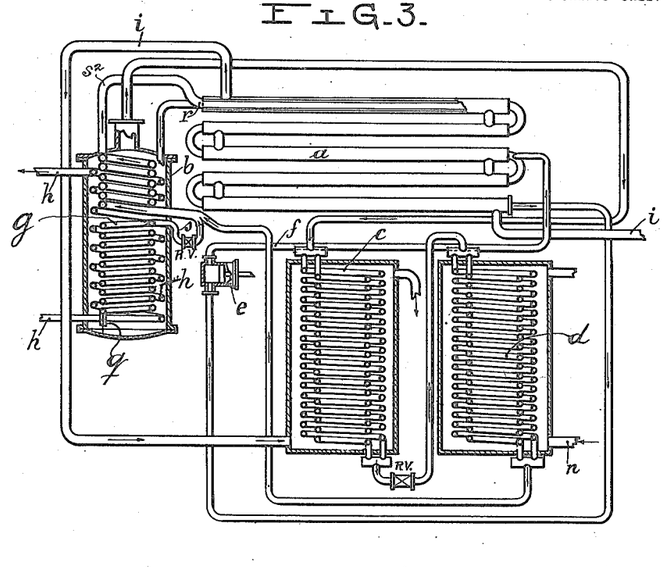
Fig. 3 shows an absorption machine with "overlapping" temperatures.

In such counter current absorption machines as described above it is possible to obtain a better coefficient of performance. It is still impossible however to reach the coefficient of performance equal to 1. Now this coefficient of performance 1, will be reached by carrying the distillation farther than supposed in the embodiment illustrated in Fig. 2. If this is done the weak liquor is still unsaturated under the lower pressure in the absorber at a higher temperature than the initial temperature of the generator. Absorption begins at temperatures that cause evolution of ammonia in the generator. If heat exchange is now made between the parts of absorber and generator at approximately equal temperatures, the considerable heat of absorption evolved in the absorber, throughout this range of temperature, is immediately added to the heat of the generator, so that the amount of heat to be supplied to the generator by the heating coil for the same cooling effect will be relatively smaller. At the same time the consumption of heat by distillation in the generator cools the hottest part of the absorber. Consequently the cooling effect required from the cooling water coil in the absorber will be smaller. The higher the final temperature of the generator is taken, the greater is the coefficient of performance. The heat exchange between generator and absorber may be effected by direct contact between the chambers or by circulating liquids. Fig. 3 represents such an absorption machine with "overlapping" temperatures, the reference characters corresponding to those in the previous figures. The rich liquor does not go back through the whole absorber $a$, but leaves it at $r$ with approximately the initial temperature of the generator $b$ and then enters the latter. It should namely be remembered that the absorber continues as a coiled pipe $g$ in the upper part of the distillating portion of the generator $b$. In the same way the poor liquor does not go back through the whole generator $b$ but leaves it at $s$, with approximately the initial temperature of the absorber which it then enters through pipe $s^2$. Cooling pipes $i$ pass through only part of the length of the absorber $a$, namely to $r$. On the other hand the steam heating coils $h$ pass along the whole length of the generator $b$, because the amount of heat consumed in the generator will be greater at its cold end than at its hot end and likewise the amount of heat produced by absorption is greater at low temperature, so that the consumption and the production of heat are unequal to those parts of the machine, which are heat exchanging. This improved absorption machine is also advantageously employed for economical production of power for miscellaneous use. For this purpose a part or the whole of the gas evolved in the generator is sent into a working cylinder instead of into the condenser and is afterward made to enter the absorber. The production of work may thus be the exclusive object of the plant.

Figure 4:
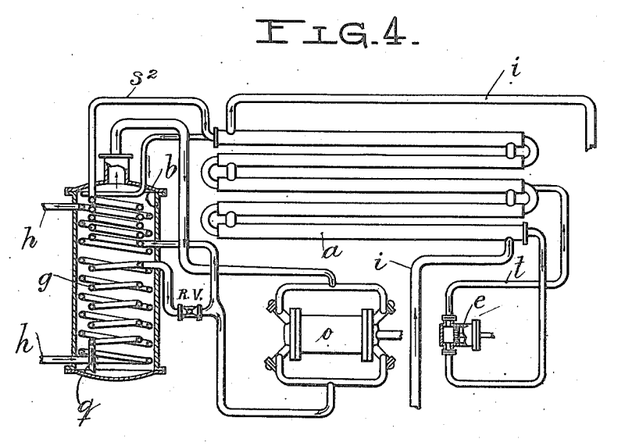
Fig. 4, a similar plant, where the production of work is the exclusive object.

In Fig. 4, $o$ represents the working cylinder of an engine. The vapor coming from the generator $b$ enters this cylinder and then goes to the absorber $a$ through the pipe $s^2$, after first having passed through a coil in the generator. With this new "overlapping" of temperature it will be advantageous to operate without leading the liquors in counter current through the chambers and other parts, especially if differences in pressure are only small. Naturally the advantage will be greater, if counter current is made.

Figure 5:
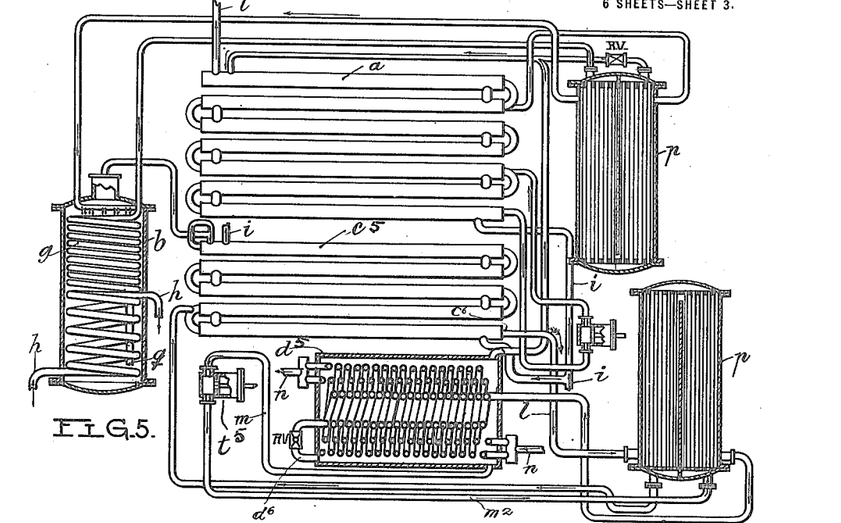
Fig. 5 shows a plant with auxiliary absorber and auxiliary evaporator, together with an exchanger.

These absorption machines described above, work as machines in a manner contrary to machines of earlier systems, having a coefficient of performance which increases, as the difference of temperature between the condenser and refrigerator decreases, caused by more overlapping of temperatures, the end temperature of the refrigerator being constant. This arrangement has however, certain disadvantages, as for instance, the high pressure caused by the vapor pressure of the ammonia in the condenser at the given cooling water temperature. To overcome this defect, the simplest way is to refrigerate by absorption and gas generation instead of by condensation and evaporation. Machines for this purpose are well known but owing to the improper circulation of the liquors, the losses in these old machines are greater than with the arrangement of condenser and refrigerator. The losses will however become small if the condenser is replaced by an auxiliary absorber, and the refrigerator replaced by an auxiliary evaporator operating on the counter current principle as described above. The rich liquor from the auxiliary absorber is conducted in a heat exchanging manner and in counter current through the auxiliary evaporator to its coldest end and then made to enter while the weak liquor is conducted in a heat exchanging manner and in counter current through the auxiliary absorber to its hottest end and made to then enter the latter. Fig. 5 shows the scheme of such a plant with auxiliary absorber $c^5$ and auxiliary evaporator $d^5$ together with an exchanger $p$. The gas coming from the generator $b$ is absorbed in the auxiliary absorber $c^5$. The enriched liquor leaves this auxiliary absorber by the piping $l$ passing through the lower exchanger $p$ where it exchanges heat with the liquor coming through the pipes $m$, $m^2$ and pump $t^5$ from the auxiliary evaporator $d^5$, passes the latter by way of pipe $l^2$ in counter current to its coldest end, and then enters it through a regulating valve $d^6$. The distilled liquor is forced by the pump $t^5$ into the piping $m^2$ and goes into the auxiliary absorber $c^5$ after having passed the exchanger $p$, and enters the latter at its hottest end. If the distillation in the auxiliary evaporator $d^5$ is carried on down to the initial temperature of the cooling water, that is, the final temperature or final concentration of the auxiliary absorber $c^5$, a separate heat exchanger is not required. The initial temperature of the auxiliary absorber is the same in this case as the initial temperature of the generator. It seems that cooling effect produced at a temperature a little below that of the cooling water is of no value. But this effect is produced without further expenditure of heat and is thus of value for pre-cooling rooms and the like.

Figure 6:
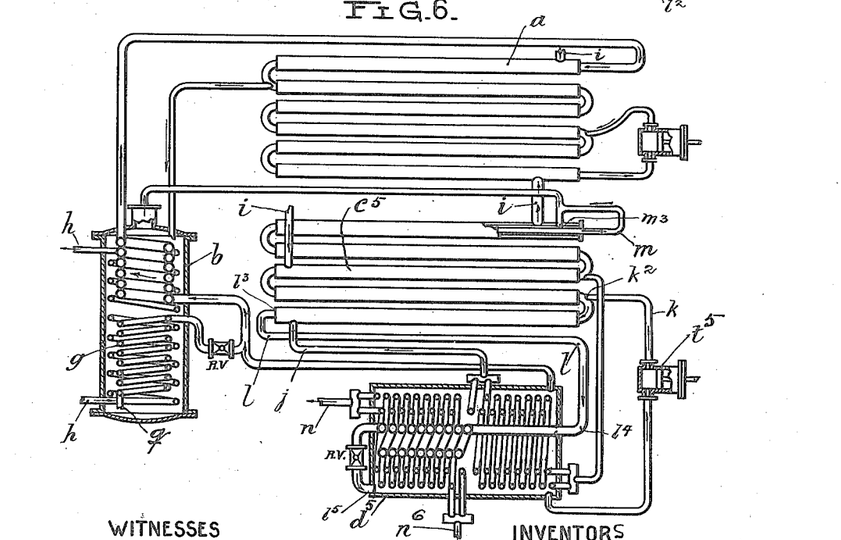
Fig. 6, a similar plant having three absorption machines working at different temperatures and independent of each other.

If it is required to produce low temperatures with small difference of pressure, it is necessary to cool the auxiliary absorber $c^5$ by means of a part of the cold produced in the refrigerator. The lowest temperature of the auxiliary absorber $c^5$ lies then below the highest temperature of the auxiliary evaporator $d^5$. That is to say the temperatures "overlap." This arrangement is shown in Fig. 6. The pump $t^5$ forces the distilled liquor through pipe $k$ into the auxiliary absorber $c^5$ which it enters at the point $k^2$ where the temperature corresponds to its own highest temperature, the liquor going then through the piping $m$ in counter current to the hot end of the auxiliary absorber $c^5$ where it enters the same at $m^3$. The liquor strengthened in the auxiliary absorber $c^5$, goes through the pipe $l$ from its cold end at $l^3$ into the auxiliary evaporator $d^5$, which it enters at the point $l^4$ where the temperature corresponds to its own lowest temperature and runs in counter current through the same and finally enters it at $l^5$. The cooling water passes in the pipe $i$ only through the hotter part of the auxiliary absorber $c^5$, the cooler part being cooled by communication through pipe $j$ with the auxiliary evaporator $d^5$. Useful cooling effect is produced only at the coldest end of the auxiliary evaporator $d^5$ and is transferred to the brine by means of the coil $n$. The auxiliary absorber $c^5$ and the auxiliary evaporator $d^5$ thus partly exchange their heat. In this way the lowest temperature of the auxiliary absorber can be brought considerably below the initial temperature of the cooling water and very low temperatures, even with cooling water of high temperature, obtained without an excessive increase of pressure. The heat exchange may also be effected by circulating liquid. For instance the brine returning from the cold rooms may be forced in counter current through the coldest parts of the auxiliary absorber $c^5$ instead of first entering the refrigerator. It thus cools the auxiliary absorber $c^5$ below the initial temperature of the cooling water and enters the auxiliary evaporator at a hotter point of it. It is possible also to drive the auxiliary absorber $c^5$ and auxiliary evaporator $d^5$ as described above by means of a compressor.

Figure 7:
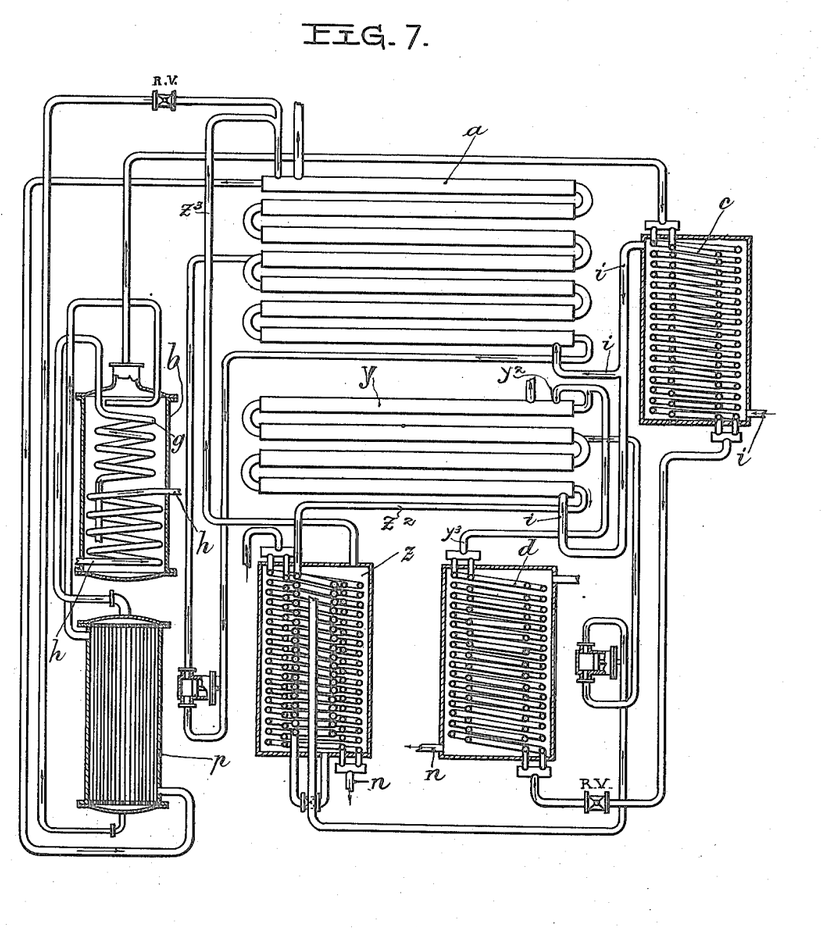
Fig. 7 shows a combined multiple absorption machine for production of mechanical energy.

A further possibility to make the coefficient of performance greater than unity, in absorption cooling machines, consists in making use of the improvement shown in Fig. 1 with aid of that shown in Fig. 4, that is to say, with the machines having auxiliary evaporator and without the use of "overlapping" of temperature, as shown in Fig. 3. The ammonia vapor leaving the refrigerator $d$, see Fig. 7, has at the initial temperature of the refrigerator, for instance, 10° C., still a considerable pressure, for ammonia about 3 kilog. per square cm. This gas, instead of passing direct to the absorber $a$ of an absorption machine enters at $y^2$ an auxiliary absorber $y$ through pipe $y^3$ with which is associated an auxiliary evaporator $z$ through the intermediary of a pipe $z^2$. In this chamber the gas will evolve once more the same quantity of cold at a pressure of say 1 kilog. per square cm. The gas leaving the auxiliary evaporator by way of pipe $z^3$ now goes into the absorber $a$ of the absorption machine as shown in Fig. 7. Continuing in this way it is possible to provide for this absorption of the gas coming out of the refrigerator $d$, which will give a third stage. The number of stages possible depends on the fall of temperatures required and also on the temperature of the cooling water available. Each additional stage produces without any considerably increased expenditure of heat, nearly the same cooling effect as the first stage, and the cooling efficiency increases with the number of stages. It is of advantage by this type to provide a rectifier.

It is obviously advantageous to arrange machines to work in the new manner in several stages whatever type of the known absorption machines is used. Using, however, partly or entirely the improvements shown in Figs. 1 and 4, the advantage will be still greater.

It is preferable for a maximum coefficient of performance, to add the heat to the generator at a temperature as high as possible.

Figure 8:
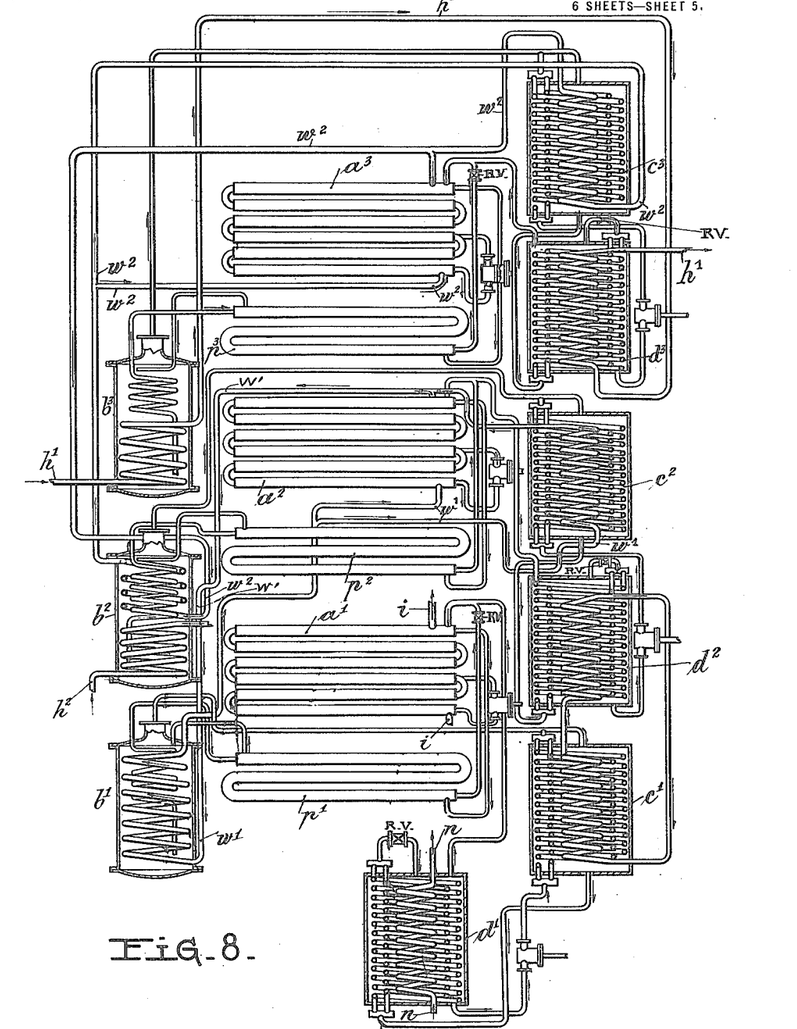
Fig. 8, a heat plant with three absorption machines, and Fig. 9, a combined multiple absorption machine for production of mechanical energy.

To attain this end, three absorption machines are arranged to operate at different temperatures independent of each other. In Fig. 8 the three machines have respectively the following parts: absorbers $a^1$, $a^2$, $a^3$, generators $b^1$, $b^2$, $b^3$, auxiliary absorbers $c^1$, $c^2$, $c^3$, refrigerators $d^1$, $d^2$, $d^3$, exchangers $p^1$, $p^2$, $p^3$, connecting pipes $w^1$, $w^2$, $w^3$ besides parts similar to those already described. The three machines operate in such manner that the auxiliary absorber $c^2$, see Fig. 8, and the absorber $a^2$ of the second machine stand in heat transferring connection through pipes $w^1$, with the generator $b^1$ of the first machine. The heat produced in absorber $a^2$ and auxiliary absorber $c^2$, is thus conducted into the generator $b^1$ of the first machine, to which end the temperatures must stand in suitable relation to each other. As is always the case, the heat generated in the auxiliary absorber or condenser $c^2$ and the absorber $a^2$ together is greater than the heat absorbed in the generator $b^1$ by the amount of the produced cooling effect. The heat absorbed in the generator $b^2$ of the second machine, to produce the same cooling effect, in the refrigerator of the first, can thus be smaller by this amount. The use of this excess heat, to heat the generator of another machine, also enables the coefficient of performance of absorption machines to be raised above unity. The cooling effect of the refrigerator $d^2$ of the second machine may be used to cool the auxiliary absorber $c^1$ of the first machine, thus diminishing the quantity of cooling water required. The refrigerator $d^3$ of the third machine can be heated by means of any low temperature waste heat, as shown by the pipes $h^1$, $h^2$ which represents additional heating coils. The condenser or auxiliary absorber $c^3$ and absorber $d^3$ of the third machine are in heat transferring connection with the generator $b^2$ of the second machine through pipe $w^2$. As a consequence, the heat expended to produce the same cooling effects is still smaller.

The relative dimensions of the machines can be such that the excess heat produced in the one is sufficient to heat the generator of the other. Or in addition the heat of the exhaust gases of the furnace can be utilized.

Figure 9:
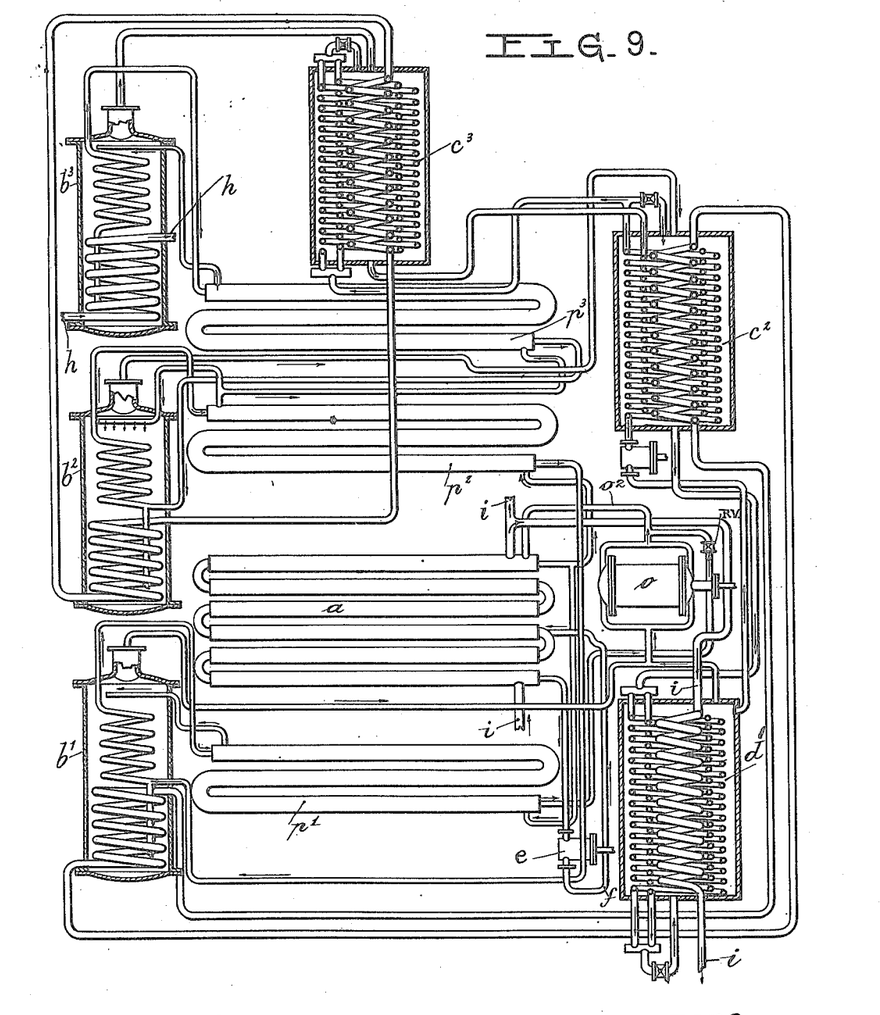

The pressure in each single machine may be chosen at will. Generally the multiple absorption machines require the provision of large surfaces for heat transference and this influences the cost of manufacture. If the pressure in the auxiliary absorber and evaporator of the first machine is the same as the pressure in the auxiliary evaporator and absorber of the second, the degrees of concentration are equal, the temperatures also being equal. Consequently the corresponding chambers may be united and the dimensions for equal output become considerably smaller. The absorber $a^2$ of the second machine is then superfluous and the generator of the first can be of about half its size. In the same way the auxiliary evaporator $c^2$ of the second machine is superfluous and the auxiliary absorber of the first machine can be smaller. In the united chambers a considerably smaller quantity of liquor is circulating, the quantity circulating in the combined system being equal to that circulating previously in the first machine alone, although the heat consumption for a given refrigerating effect has become much smaller. Fig. 9 shows such a combined multiple absorption machine adapted for the production of mechanical energy. $o$ is the working cylinder supplied with vapor from the generator $b^1$ and the refrigerator $d^1$. The working cylinder delivers the expanded vapor into the absorber $a$ through pipe $o^2$. The enriched liquor is forced by the pump $e$ into a pipe $f$ which leads the strong liquor to the three generators. The weak liquor is returned in the usual manner to the absorber $a$. The liquors coming from the different chambers are to be conducted separately, or otherwise the pressure of the higher temperature chambers must be throttled in several stages by valves, not shown in the drawing. The gases generated in the last two generators $b^2$ $b^3$ pass into the corresponding auxiliary absorbers $c^2$ $c^3$ and are there absorbed. The liquors circulate in the same way as before. The auxiliary absorber corresponding to the first generator is replaced, when the machine is to develop mechanical energy, by an auxiliary evaporator $d^1$, the heating of which is effected as shown in the drawing by warmed cooling water from the absorber $a$. The heat coil $h$ as indicated in this arrangement, runs through the last generator only. In this way it is possible to attain a very high temperature and consequently a good utilization of heat. The new arrangement is of great benefit even when applied to machines of known types. The new arrangement of leading the liquors through the various chambers in counter current as described, will however, still further increase the advantages.

The described principle of the reversible absorption machine and its amplification is not confined to machines using ammonia liquor as working fluid. Without change it may be applied to machines using any other binary or more complicated mixture.

Claims:

1. An absorption machine for developing cold, heat or mechanical power, said machine comprising a generator and an absorber, a heat duct for said generator and cooling duct for the absorber; conduits for said absorber leading rich liquor first in one and then in the opposite direction through the absorber, pipes transferring the liquor from the absorber to the generator, a collector coil for taking up the liquor in the generator and returning it, after concentration to the absorber whereby the liquor is made to traverse both the absorber and the generator in two opposite directions.

2. An absorption machine for developing cold, heat or mechanical power, said machine comprising a generator and an absorber, a heat duct for said generator and cooling duct for the absorber; conduits for said absorber leading rich liquor first in one and then in the opposite direction through the absorber, pipes transferring the liquor from the absorber to the generator, a collector coil for taking up the liquor in the generator and returning it, after concentration to the absorber, a heat exchanger inserted between said coil and said absorber, whereby the liquor is made to traverse both the absorber and the generator in two opposite directions.

3. An absorption machine for developing cold, heat or mechanical power, said machine comprising a generator and an absorber, a heat duct for said generator and cooling duct for the absorber; conduits for said absorber leading rich liquor first in one and then in the opposite direction through the absorber, pipes transferring the liquor from the absorber to the generator, a collector coil for taking up the liquor in the generator and returning it, after concentration to the absorber, a heat exchanger inserted between said coil and said absorber, and means for circulating the liquor, whereby the liquor is made to traverse both the absorber and the generator in two opposite directions.

4. An absorption machine for developing cold, heat or mechanical power, said machine comprising a generator and an absorber, a heat duct for said generator, and cooling duct for the absorber; conduits for said absorber leading rich cold liquor first in one and then in the opposite direction through the absorber, pipes transferring the liquor from the absorber to the generator; a collector coil for taking up the liquor in the generator and returning it, after concentration to the absorber, a heat exchanger inserted between said coil and said absorber, and means for circulating the liquor, whereby cold rich liquor absorbs heat while retraversing the absorber, thereupon cools hot weak liquor encountered in the exchanger, then on descending the generator becomes denser through distillation then retraverses the generator through said coil, finally returning through the exchanger to the absorber.

5. An absorption machine for developing cold, heat or mechanical power, said machine comprising a generator, and an absorber, a heat duct for said generator and cooling duct for the absorber; conduits for said absorber leading rich liquor first in one and then in the opposite direction through the absorber, pipes transferring the liquor from the absorber to the generator, a collector coil for taking up the liquor in the generator and returning it, after concentration to the absorber, a working cylinder for an engine inserted between said coil and said absorber, whereby the generated gas is made to enter said cylinder.

6. An absorption machine for developing cold, heat or mechanical power, said machine comprising a generator and an absorber, a heat duct for said generator and cooling duct for the absorber; conduits for said absorber leading rich liquor first in one and then in the opposite direction through the absorber, pipes transferring the liquor from the absorber to the generator, a collector coil for taking up the liquor in the generator and returning it, after concentration to the absorber, a working cylinder for an engine inserted between said coil and said absorber and means for circulating the liquor, whereby the generated gas is made to enter said cylinder.

7. An absorption machine for developing cold, heat or mechanical power, said machine comprising a generator, a main absorber and an auxiliary absorber, a heat duct for said generator; and cooling duct for the absorber; conduits for said absorbers leading rich liquor first in one and then in the opposite direction through the absorbers, pipes transferring the liquor from the main absorber to the auxiliary absorber and then to the generator, a collector coil for taking up the liquor in the generator and returning it, after concentration to the main absorber, whereby the liquor is made to traverse both the absorbers and the generator in two opposite directions.

8. An absorption machine for developing cold, heat or mechanical power, said machine comprising a generator, a main absorber and an auxiliary absorber, a heat duct for said generator, and cooling duct for the absorber; conduits for said absorbers leading rich liquor first in one and then in the opposite direction through the absorbers, pipes transferring the liquor from the main absorber to the auxiliary absorber and then to the generator, a collector coil for taking up the liquor in the generator and returning it, after concentration to the main absorber, whereby the liquor is made to traverse both the absorbers and the generator in two opposite directions, a heat exchanger inserted between said coil and one of said absorbers.

9. An absorption machine for developing cold, heat or mechanical power, said machine comprising a generator, a main abto traverse both the absorbers and the gensorber and an auxiliary absorber, a heat duct for said generator, and cooling duct for the absorbers; conduits for said absorbers leading rich liquor first in one and then in the opposite direction through the absorbers, pipes transferring the liquor from the main absorber to the auxiliary absorber and then to the generator, a collector coil for taking up the liquor in the generator and returning it, after concentration to the main absorber, whereby the liquor is made to traverse both the absorbers and the generator in two opposite directions, a heat exchanger inserted between said coil and said absorber, and means for circulating the liquor.

In testimony whereof we have affixed our signatures in presence of two witnesses.

EDMUND ALTENKIRCH.
BERNHARD TENCKHOFF.

Witnesses:
WOLDEMAR HAUPT,
HENRY HASPER.